Nov. 9, 1965     A. EISELE     3,216,121
BORE GAUGE
Filed Oct. 16, 1961
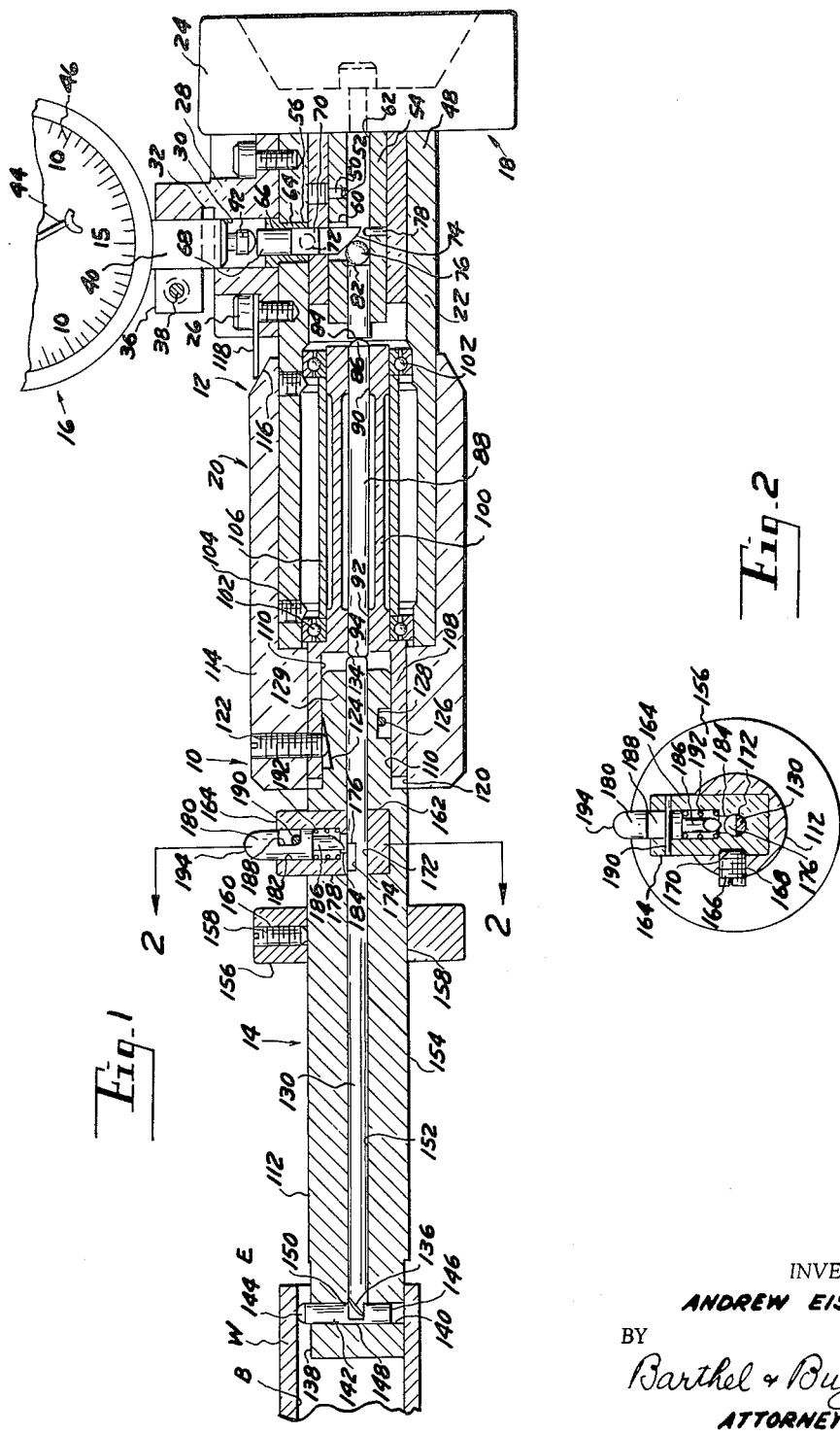
INVENTOR.
ANDREW EISELE.
BY
*Barthel & Bugbee*
ATTORNEYS

United States Patent Office 3,216,121
Patented Nov. 9, 1965

3,216,121
BORE GAUGE
Andrew Eisele, 15025 Cheyenne Ave., Detroit, Mich.
Filed Oct. 16, 1961, Ser. No. 145,245
3 Claims. (Cl. 33—178)

This invention relates to bore gauges and, in particular, to measuring heads for dial indicator bore gauges.

One object of this invention is to provide a self-contained retractible-feeler measuring head for removable insertion in a socket in a dial indicator bore gauge wherein the measuring head contains a measuring pin or feeler connected to a forward motion-transmitting rod, the measuring head being in turn removably connected to the dial indicator in motion-transmitting relationship with the mechanism of the dial indicator, means being provided on the measuring head for retracting the forward motion-transmitting rod in order to permit the measuring pin or feeler to be retracted into the measuring head.

Another object is to provide a self-contained retractible-feeler measuring head of the foregoing character wherein the retraction of the forward motion-transmitting rod is accomplished by a retracting plunger reciprocably mounted on the measuring head externally of the bore and of the socket in the bore gauge and selectively operable by the operator to retract the motion-transmitting rod so as to disengage it from the measuring pin or feeler or to release the motion-transmitting rod so as to permit it to be pushed into contact with the measuring pin or feeler by the spring contained within the dial indicator in yielding engagement with the plunger thereof.

Another object is to provide a self-contained retractible-feeler measuring head of the foregoing character wherein the measuring head, with its forward motion-transmitting rod and retracting plunger, is removable as a unit from the socket in the dial indicator mount or carrier so as to be adapted to be replaced by other measuring heads suitable for measuring different ranges of bore diameters.

Another object is to provide a self-contained retractible-feeler measuring head of the foregoing character wherein the measuring pin or feeler is adapted to be retracted substantially as far as the surface of the measuring head portion containing it, so that the outer end of the measuring pin or feeler does not contact the wall of the bore to be measured while the forward end or pilot portion of the measuring head is being inserted in the bore, whereby to prevent or greatly reduce wear on the outer end of the measuring pin by eliminating sliding contact between the measuring pin and the wall of the bore to be measured.

Other objects and advantages of the invention will become apparent during the course of the following description of the accompanying drawing, wherein:

FIGURE 1 is a central longitudinal section through a dial indicator bore gauge showing a dial indicator mount equipped with a measuring head containing a transverse measuring pin or feeler connected to a longitudinal motion-transmitting rod and also provided with a motion-transmitting rod retracting device, according to one form of the invention; and FIGURE 2 is a cross-section taken along the line 2—2 in FIGURE 1.

Referring to the drawing in detail, FIGURE 1 shows a dial indicator bore gauge, generally designated 10, according to one form of the invention as consisting generally of a dial indicator carrier 12 adapted to interchangeably receive any one of a series of self-contained retractible-feeler measuring units or heads 14 for various bore diameters. The measuring units 14 for this purpose are intended to be supplied in a set covering a range of bore diameters which is much greater than the range capable of being covered by a single measuring unit 14. In this way, the single dial indicator carrier 12 is adapted to serve for indicating a wide diameter range at a much lower cost than would be involved in the provision of separate dial indicator bore gauges covering each subdivision of that range. The dial indicator carrier 12 carries a conventional dial indicator, generally designated 16, which registers the extent of deviation of the bore being measured from the desired dimension, in the manner described below.

The dial indicator carrier 12 includes a first or stationary handle structure, generally designated 18, upon which is rotatably mounted a second or rotary handle structure, generally designated 20, the latter receiving the interchangeable self-contained retractible-feeler bore measuring units 14. The stationary handle structure 18 consists of a sleeve 22 to the rearward end of which is connected a circular or cylindrical stationary handle 24 by screws or other suitable fasteners (not shown). Mounted on the rearward end portion of the sleeve 22 and secured thereto by screws 26 threaded therein is a dial indicator holding bracket 28 having a central bore 30 which is intersected by a transverse slot 32. Above the slot 32 is a clamping portion 34 of the bracket 28 through which the bore 30 also extends and which is split by a slot 36 to provide a clamping action brought about by a clamping screw 38 upon the stem 40 of the dial indicator 16. The latter contains the usual dial indicator plunger 42 which is connected by conventional motion-transmitting mechanism (not shown) to the rotary needle 44 which registers with the graduated dial 46 of the dial indicator 16. The dial indicator 16 is conventional and its details are beyond the scope of the present invention, and such dial indicators are readily available on the open market.

Mounted inside the sleeve 22 is an intermediate bushing 48 which is bored and threaded transversely to receive a set screw 50 which engages in a transverse hole 52 in an inner bushing 54 to tie the bushings 48 and 54 together. The sleeve 22 and bushings 48 and 54 are provided with aligned coaxial transverse bores 56, 58 and 60 respectively, the latter opening into a longitudinal bore 62 in the inner bushing 54. Mounted in the bores 30 and 56 is a flanged bearing bushing 64 in which the cylindrical upper portion 66 of a transverse motion-transmitting plunger 68 is reciprocably mounted. The lower portion of the plunger 68 is flat-sided as at 70 so as to be prevented from rotating within its bores 56 and 58 by a set screw 72. The hole 60 is merely a clearance hole through which the lower end portion of the plunger 68 passes loosely. The lower end of the plunger 68 is provided with a flat inclined surface 74 which is accurately machined, as by grinding, at an angle of 45 degrees to the axis of the plunger 68. The plunger 68 and the bores in which it is reciprocably mounted are in turn disposed perpendicular to the axis of the bore 62 in the inner bushing 54.

Rollable along the bore 62 and engageable with the inclined flat surface 74 of the transverse motion-transmitting plunger 68 is a hardened precision ball 76 of substantially the same diameter as the bore 62 with sufficient clearance to be rollable therealong. The bushing 54 is drilled transversely to receive a stop pin 78 for preventing excessive travel of the ball 76 along the bore 62. Also reciprocable within the bore 62 and snugly but slidably mounted therein is a final longitudinal motion-transmitting rod 80, the flat rearward end 82 of which engages the ball 76.

The flat forward end 84 of the final motion-transmitting rod 80 is engaged by the rounded rearward end 86 of an intermediate longitudinal motion-transmitting rod 88 which is snugly but reciprocably mounted in aligned bores 90 and 92 within a rotary bushing 100. The rod 88 has a forward end 94. The bushing 100 is rotatably mounted by means of spaced anti-friction bearing units 102 in the forward end of the sleeve 22 and held in position by set screws 104 and a spacer tube 106. The rotary bushing 100 has an enlarged forward end 108 containing a socket bore 110 for receiving the rearward end of the stem 112 of the self-contained retractible-feeler measuring head or unit 14.

Rotatably mounted upon the forward portion of the sleeve 22 is a tubular knurled rotary handle 114, the rearward end 116 of which is beveled and graduated for registry with a pointer 118 mounted on the forward screw 26. The forward end portion of the rotary tubular handle 114 has a reduced diameter longitudinal bore 120 the wall of which engages the enlarged forward end 108 of the rotary bushing 100. The tubular handle 114 and bushing end 108 are drilled transversely in alignment and threaded to receive a headless set screw 122, the inner end of which engages in an inclined shallow flat recess 124 in the rearward end of the stem 112.

The rearward end portion of the stem 112 is drilled transversely to receive a pin 126 disposed along a chord of the socket bore 110 and engaging the bottom of a longitudinal recess 128 in the reduced diameter end portion 129 of the stem 112 in order to prevent rotation thereof. Reciprocably mounted within the stem 112 is an elongated forward motion-transmitting rod 130 disposed in a longitudinal bore 132 and having a rearward end 134 engageable with the forward end 94 of the intermediate motion-transmitting rod 88. The forward motion-transmitting rod 130 is provided with an accurately machined inclined forward end surface 136 disposed at an angle of substantially 45 degrees to the longitudinal axis of the forward motion-transmitting rod 130 and rounded transversely so as to possess a forward end surface of arcuate cross section.

The stem 112 of the measuring unit 14 has a slightly reduced diameter forward end portion 138 containing a transverse bore 140 in which a measuring pin or feeler 142 is reciprocably mounted. The measuring pin 142 has a rounded outer end 144 which engages the bore surface B to be measured. Intermediate its outer and inner ends 144 and 146 the measuring pin or feeler 142 is provided with a notch 148 of approximately U-shaped cross section having a sharp edge 150 engaged by the inclined forward end 136 of the forward motion-transmitting rod 130. The rod 130 is reciprocably mounted in the longitudinal bore 132 within the stem 112, the latter having an outer intermediate surface 154 of greater diameter than the opposite end portions 138 and 129 of the stem 112 and carries a stop collar or disc 156 having a bore 158 snugly but slidably receiving the stem surface 154. The stop collar 156 is adjustably secured as by the headless set screw 158 in the radial bore 160 to the stem 112.

Immediately adjacent the reduced diameter portion 129 of the stem 112 but externally of the forward end of the tubular knurled rotary handle 114 and socket bore 110, the stem 112 is provided with a radial bore or socket 162 intersecting the longitudinal bore 152 and containing a tubular plug 164 held in position by a headless set screw 166 (FIGURE 2) threaded transversely and radially into a hole 168 with its inner end engaging a flat spot 170 forming a chord of the outer surface of the plug 164. The plug 164 has a transverse bore 172 aligned with the longitudinal bore 152 of the stem 112 for the passage of the forward motion-transmitting rod 130, which near the same location contains a transversely-directed notch 174 having a rearward edge 176 engaged by the obliquely-directed or beveled lower end 178 of a cam portion 178 of a retracting push button or retraction plunger 180 in the form of an elongated pin reciprocably mounted in a bore 182. The bore 182 has a smaller diameter extension 184 which connects it with the bore 152 yet is of sufficient size to receive the reduced diameter lower end portion 186 of the retraction button 180. The latter near its outer end is provided with a tangential groove 188, the bottom of which is engaged by a pin 190 for preventing rotation of the button 180. The button 180 is urged radially outward by a compression spring 192 mounted in the inner end of the bore 182.

The outer end 194 of the retraction button 180 is rounded for convenience of engagement by the operator's thumb.

In the operation of the invention, the proper measuring unit 14 is selected which has a head diameter 128 and a measuring pin 142 of suitable sizes for the measurement of the particular diameter or range of diameters of the bore B. The end portion 129 of the selected unit 14 is inserted in the socket bore 110 of the rotary sleeve enlargement 108 and clamped in position by means of the set screw 122 against the inclined flat surface 124.

The operator then retracts the forward motion-transmitting rod 130 by pressing downward upon the rounded end 194 of the operating button 180, causing the engagement of its beveled inner end 178 with the recess edge 176 to move the forward motion-transmitting rod 130 rearwardly so as to disengage its beveled or inclined forward end 136 from the sharp edge 150 of the notch 148 and at the same time to withdraw the forward end portion of the forward motion-transmitting rod 130 from the notch 148 in the measuring pin 142. This action permits the measuring pin 142 to drop freely by gravity within the transverse bore 140 toward the longitudinal axis of the stem 112 so that its outer end 144 is retracted substantially to the level of the forward end portion 138 of the stem 112, thereby eliminating wear upon the tip 144. The present invention also enables the tip 144 of the measuring pin 142 to be retracted so as to avoid any obstacle between the measurement point and the outer end E of the workpiece W, such as, for example, an internal flange or shoulder.

With the measuring pin or feeler 142 thus retracted, the forward end portion 138 of the stem 112 is then pushed into the bore B to be measured, preferably until the forward end E of the workpiece W containing the bore B engages the stop collar 156. The operator now releases the push button 180, whereupon the spring-urged dial indicator plunger 42 urges the rounded end 144 of the measuring pin 142 into engagement with the surface of the bore B, causing the forward, intermediate and rearward motion-transmitting rods 130, 88 and 80 to move correspondingly so as to actuate the plunger 42 of the dial indicator 16 and cause the needle 44 thereof to register the measurement upon the graduated dial 46. The operator then depresses the push-button 180 to again retract the motion-transmitting rod 132 and measuring pin 142 before withdrawing the forward stem portion 138 from the bore B of the workpiece W.

In particular, when the operator withdraws his finger from the end 194 of the button 180, the compression spring 192 forces the latter outward into the retracted position shown in FIGURES 1 and 2, thereby disengaging the beveled surface 178 from the sharp edge 176 of the notch 174 and permitting the spring (not shown) within the dial indicator 16 to push the motion-transmitting rods 66, 80, 88 and 130 in a forward direction.

What I claim is:
1. A self-contained retractible-feeler measuring head for removable insertion in a socket in the forward end of a bore gauge including an elongated dial indicator carrier having a connection at its rearward end adapted to hold a dial indicator and having a passageway therethrough containing a rearward motion-transmitting member engageable with the dial indicator plunger, said measure head comprising a feeler element support having its rearward end portion configured for mating insertion in the socket in the forward end of said dial indicator carrier and having a longitudinal passageway therethrough communicating with said dial indicator passageway and a transverse passageway communicating with the forward end of said longitudinal passageway, a feeler element reciprocably mounted in said transverse passageway with its outer end adapted to engage the surface of the bore to be measured, a forward motion-transmitting assembly reciprocably mounted in said longitudinal passageway in motion-transmitting relationship with said feeler element and including a forward motion-transmitting member engaging said feeler element in motion-converting relationship, and a retraction plunger reciprocably mounted in said feeler element support remote from said feeler element and retractingly engageable with said forward motion-transmitting member for retracting the same from engagement with said feeler element whereby to permit retraction of said feeler element into said support.

2. A self-contained retractable feeler measuring head according to claim 1, wherein said forward motion-transmitting member has a shoulder thereon and wherein said means retraction plunger has a cam portion thereon retractingly engageable with said shoulder.

3. A self-contained retractible-feeler measuring head according to claim 2, wherein said cam portion comprises a beveled end portion on said retraction plunger.

References Cited by the Examiner

UNITED STATES PATENTS

| | | | |
|---|---|---|---|
| 2,454,246 | 11/48 | Worthen | 33—178 |
| 2,587,099 | 2/52 | Bishop et al. | 33—178 |
| 2,884,699 | 5/59 | Eisele | 33—178 |
| 3,030,709 | 4/62 | Eisele | 33—174 |

FOREIGN PATENTS 646,248   11/50   Great Britain.

ISAAC LISANN, *Primary Examiner.*